COMBINATION TELEPHONE ENCLOSURE MOUNTING AND SHELF

Filed Dec. 29, 1964

13 Sheets-Sheet 1

INVENTORS J. W. ERICSSON
R. E. PRESCOTT
BY E. J. Olinder
ATTORNEY

Aug. 29, 1967 J. W. ERICSSON ETAL 3,338,002

COMBINATION TELEPHONE ENCLOSURE MOUNTING AND SHELF

Filed Dec. 29, 1964

13 Sheets-Sheet 2

Aug. 29, 1967 J. W. ERICSSON ETAL 3,338,002

COMBINATION TELEPHONE ENCLOSURE MOUNTING AND SHELF

Filed Dec. 29, 1964

13 Sheets-Sheet 6

Aug. 29, 1967 J. W. ERICSSON ETAL 3,338,002

COMBINATION TELEPHONE ENCLOSURE MOUNTING AND SHELF

Filed Dec. 29, 1964 13 Sheets-Sheet 7

Aug. 29, 1967 J. W. ERICSSON ETAL 3,338,002

COMBINATION TELEPHONE ENCLOSURE MOUNTING AND SHELF

Filed Dec. 29, 1964

13 Sheets-Sheet 9

Aug. 29, 1967 J. W. ERICSSON ETAL 3,338,002

COMBINATION TELEPHONE ENCLOSURE MOUNTING AND SHELF

Filed Dec. 29, 1964 13 Sheets-Sheet 10

United States Patent Office 3,338,002
Patented Aug. 29, 1967

3,338,002

COMBINATION TELEPHONE ENCLOSURE MOUNTING AND SHELF

James W. Ericsson, Indianapolis, Ind., and Robert E. Prescott, Rumson, N.J., assignors to Bell Telephone Laboratories, Incorporated, New York, N.Y., a corporation of New York Filed Dec. 29, 1964, Ser. No. 421,866
5 Claims. (Cl. 52—28)

This invention relates to coin telephone mounting arrangements and more specifically to panel, roof and shelf assemblies.

For the majority of coin telephones, the usual requirements of privacy, convenience, and in some instances protection against inclement weather, dictate a need for a telephone booth type of installation. Telephone booths are relatively expensive, however, and in many situations booths are, in fact, not required or cannot be installed owing to space limitations. In transportation terminal buildings, for example, customers are typically in a hurry and telephone conversations are inclined toward brevity. As a result, the need for privacy in such environments is reduced. Moreover, in such environments the evident limitation on space, coupled with the need for a relatively large number of pay telephone stations, virtually precludes the installation of telephone booths to the exclusion of more compact arrangements. Another case in which conventional telephone booths must be replaced with a substantially different type of telephone mounting is the increasingly popular "drive-up" coin telephone installation wherein the coin telephone is accessible to the customer from his automobile.

A variety of combination panel and shelf assemblies have been developed heretofore in an effort to meet the indicated need for compact coin telephone mounting arrangements. The expected advantages of reduced costs, reduced space and simplicity in assembly and disassembly have not fully been achieved, however, owing at least in part to the widespread diversity in design that has developed. In the past, one type of mounting has been designed for a single wall installation; another type has been developed for multiple wall mounting; additional types have been developed for pedestal mounting, both single and multiple, and still other types have been developed for various group installations and for drive-up arrangements. As a result of this wide variety in coin telephone mountings that heretofore has been required to meet the particular parameters that are imposed at each different type of site, the attendant problems of stocking and supply have become unduly complex.

Accordingly, one object of the invention is to simplify coin telephone mountings.

Another object is to increase the versatility and adaptability of coin telephone mountings.

An additional object is to reduce the cost of coin telephone mountings.

These and other objects are achieved in accordance with the principles of the invention by the utilization of a single basic coin telephone housing structure that may be readily adapted to meet the requirements of a variety of installation types. More specifically, this basic structure comprises a unique truncated wedge-shaped metallic frame or housing wherein the included angle is substantially a right angle. A portion of the sides of the housing are cut out to receive removable side panels which are disposed with respect to each other at approximately 90 degrees. The bottom of the angle is a sub-shelf affixed to the sides with a suitable finished writing shelf superimposed thereover. The top of the unit is enclosed by a roof member slanted toward the rear of the installation and an illuminatable "TELEPHONE" sign is interposed below the roof member and within the frame. Means are provided for mounting the telephone inside the included right angle across the apex thereof.

A key aspect of the invention lies in the ready adaptability of the described structure to a wide variety of different installations. For a ground surface mounting, for example, the principles of the invention call for the use of a unique support post in the form of a simple angle member typically formed from structural steel. The apex of the angle, which is substantially a right angle, is at the rear of the installation with the open part of the triangle being toward the front. A gusset is employed at the top of the post to provide roof support and to provide access for power and telephone lead-ins. A backing plate is affixed across the otherwise open portion of the post to provide a mounting surface for the basic structure described above. The lower portion of the post includes additional gusset members to increase the stiffness of the post. Suitably affixed covers are employed below the housing to enclose the otherwise open triangle of the post.

The enclosed channel formed by the support post and covers is employed to accommodate conduits for telephone and power leads when such leads are brought up from the ground. Additionally, this space is utilized in accordance with the invention for accommodating a circuit breaker or junction box when the service entrance is made from underground.

The post support described is uniquely suitable for burying in concrete or, when made in shorter lengths, for affixing to a base plate. Additionally, the triangular shape of the post cross section together with the similar triangular shape of the frame structure lends itself to a number of different types of assembly. For example, a second post may be employed to provide a double or back-to-back dual post mounted installation. Alternatively, either three or four mountings may be suspended from a pair of back-to-back posts, or three mountings may be supported by a single post. A mounting in accordance with the invention is equally adaptable for a number of different back support situations and once again the basic triangular shape appears uniquely useful in the variety of assemblies permitted, including side-by-side, around-the-corner, in-a-corner or on a flat wall.

Another aspect of the invention relates to the means for accommodating power and telephone wiring when posts of the type described above are used in a back-to-back or other multiple type arrangement and only one post is provided with the indicated wiring. In this case, the principles of the invention call for the utilization of a dual function wiring enclosure structure which fits between the posts and is held in place by suitable nipple members threaded into the holes in the posts to pass wires from one post to the other. The enclosure also serves uniquely as a means of support for fastening the top of the posts together to ensure a close fit.

Accordingly, one feature of the invention relates to a coin telephone mounting employing a truncated wedge-shaped frame structure having an included angle that is substantially a right angle.

Another feature of the invention pertains to a coin telephone mounting post support having a substantially right triangular cross section with a mounting plate and cover plates affixed across the hypotenuse thereof, thereby forming the enclosed accommodation for power and telephone line conduits.

A further feature resides in a coin telephone shelf, panel and roof assembly that is readily adaptable for either wall or post mounting. An additional feature concerns a multiple coin telephone mounting arrangement wherein the basic structure for each mounting is a truncated wedge-shaped frame and wherein each of the frames is affixed to a post support indicated above and wherein each of the post supports is mounted in abutting relation to two other post supports, the mounting arrangement being substantially square in cross section and including facilities for the mounting of four telephones.

The principles of the invention together with additional objects and features thereof will be fully apprehended from the following detailed description of certain illustrative embodiments of the invention and from the appended drawing, in which.

Figure 1:
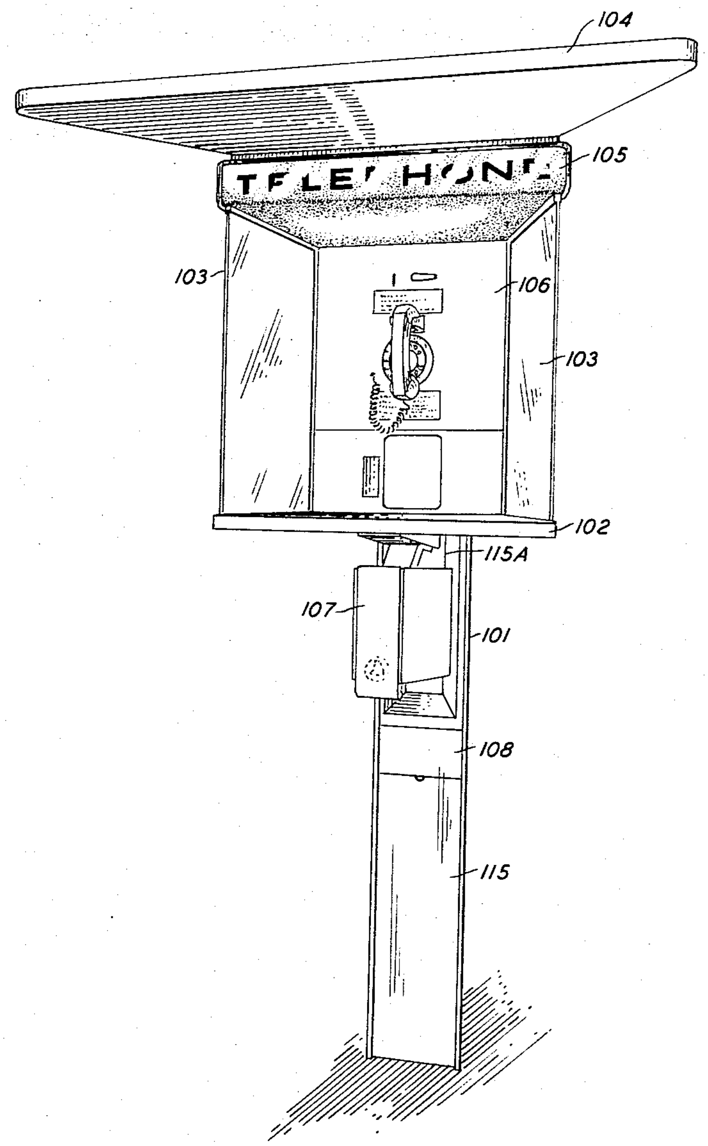
FIG. 1 is a front perspective view of a combination telephone enclosure mounting and shelf in accordance with the invention.
Figure 2:
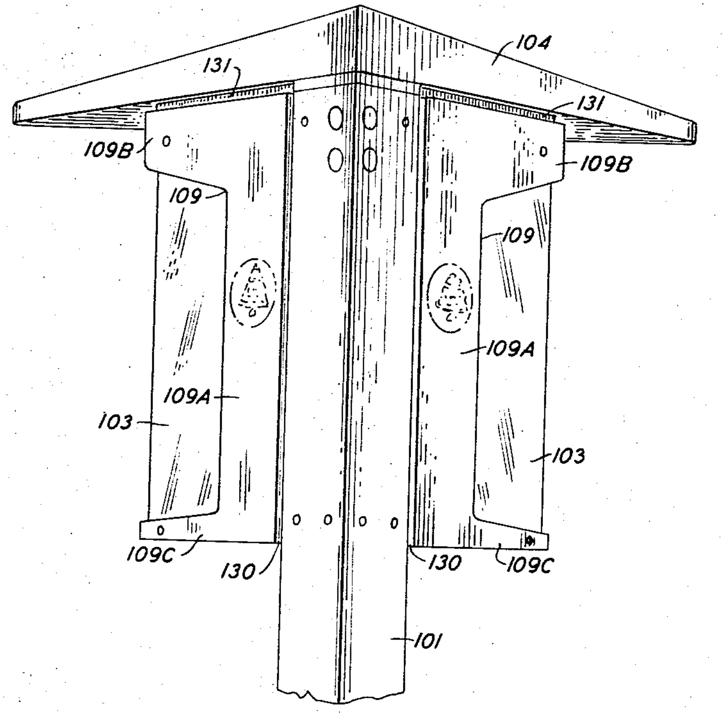
FIG. 2 is a fragmented rear view of the structure shown in FIG. 1.
Figure 3:
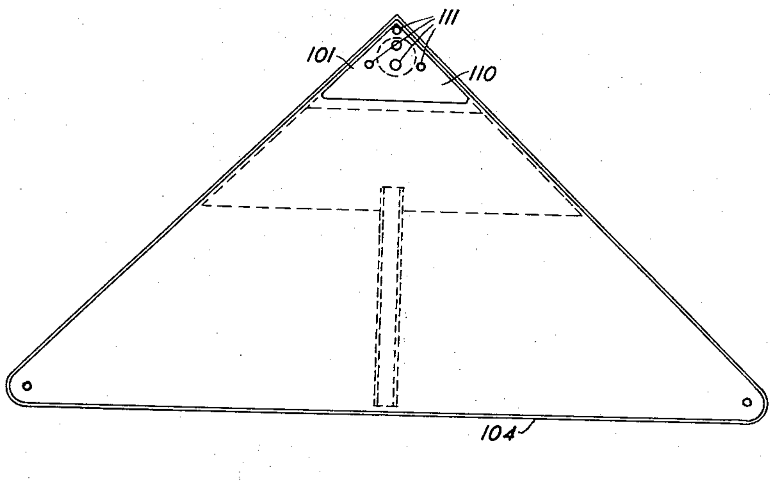
FIG. 3 is a top view thereof.
Figure 10:
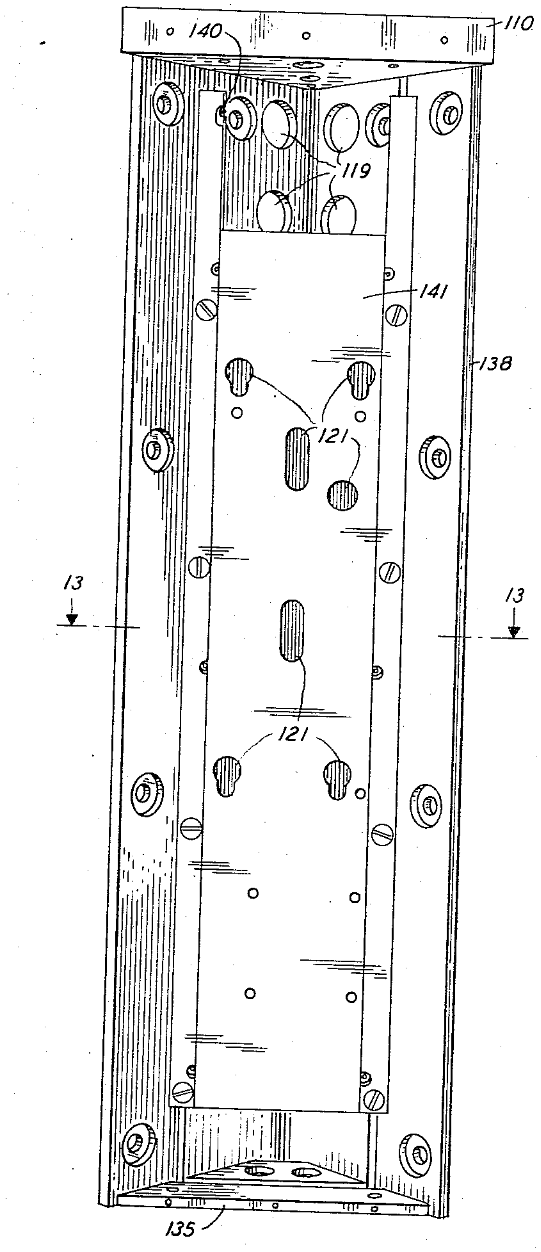
FIG. 10 is a front perspective view of the supporting structure for a corner wall mounting.
Figure 11:
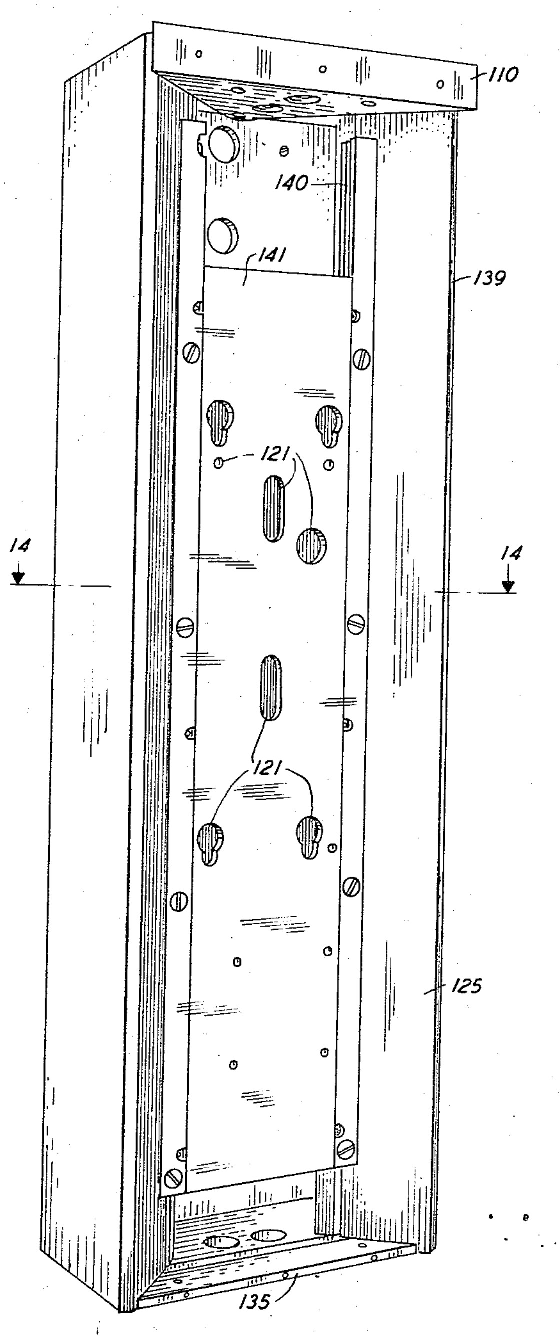
FIG. 11 is a front perspective view of the supporting structure for a flat wall mounting.
Figure 20:
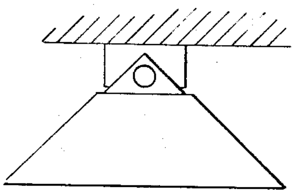
FIG. 20 is a top schematic view of a mounting structure in accordance with the invention in an "against-the-wall" configuration.
Figure 25:
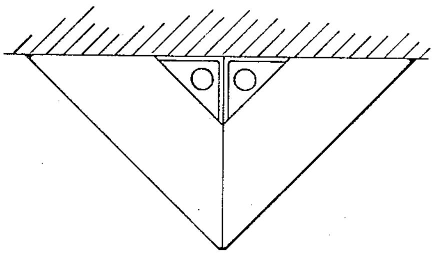
FIG. 25 is a top schematic view of two "side-by-side" mountings installed against a wall.

As shown in FIGS. 1 and 2, a telephone housing and support structure in accordance with the invention comprises a housing 109 for a panel coin telephone 106 and a means for supporting housing 109 on a support member such as post 101. Post 101 may be constructed for emplacement in concrete, as in the case of an outside "walk-up" or "drive-in" installation or it may be arranged for attachment to a suitably anchored baseboard (not shown). Alternatively, the housing support may be a relatively short post-like structure, as shown in FIG. 10, for example, suitable for an inside "in-the-corner" installation or, as shown in FIG. 25, two side-by-side installations on a wall, or, as shown in FIG. 11, a mounting with a flat rear portion suitable for mounting against a wall as shown in FIG. 20. Housing 109 may be suitably affixed to the support structure by bolts or similar fasteners.

Another feature of the arrangement shown in FIG. 1 is the employment of a panel type coin telephone 106 which has a flush or flat front surface covering the entire inner apex of housing 109. Auxiliary features of the FIG. 1 installation include a directory 107, a canopy 104 and an illuminatable sign 105. It is to be noted that the interior angle of triangular post 101, the interior angle of housing 109 and the rear interior angle of canopy 104 are all substantially 90 degrees, which imparts a distinctive impression of unity of structure to the installation and additionally serves to accentuate the focal point location of the telephone set. As discussed in greater detail hereinbelow, the common use of an included right angle in the post, the mounting, the sign and in the canopy is a key aspect of the versatility of a structure in accordance with the invention insofar as its adaptability to a wide variety of multiple installations is concerned.

Side panels 103 are suitably arranged for mounting in the open or cut-out side wings of housing 109. Panels 103 may advantageously be constructed of clear glass, of a translucent plastic material or alternatively of acoustic material. Details of each of the key structural elements of a combination coin telephone housing and mounting arrangement in accordance with the invention are set forth in the titled sections below.

*Housing*

Housing 109, which may best be seen in FIGS. 2, 3, 5, and 6, is a truncated wedge shaped structure, typically formed of welded sheet steel, having an included inside, vertical angle of substantially 90 degrees. As shown in FIG. 2, the sides are cut out to accommodate removable panels 103 that are slidably mounted in mounting grooves 103A, shown in FIG. 6. Enclosing the bottom of housing 109 in a steel sub-shelf 109D, FIG. 5, suitably affixed, as by welding, to the sides of housing 109. Writing shelf 102, FIGS. 1 and 7, which may be of finished stainless steel, for example, is superimposed over sub-shelf 109D. The top of housing 109 is enclosed by a roof portion 109E, shown in FIG. 5. Roof portion 109E, which is typically secured by welding, provides a cover for illuminated sign 105, shown in FIG. 1.

Figures 4, 23, 24:
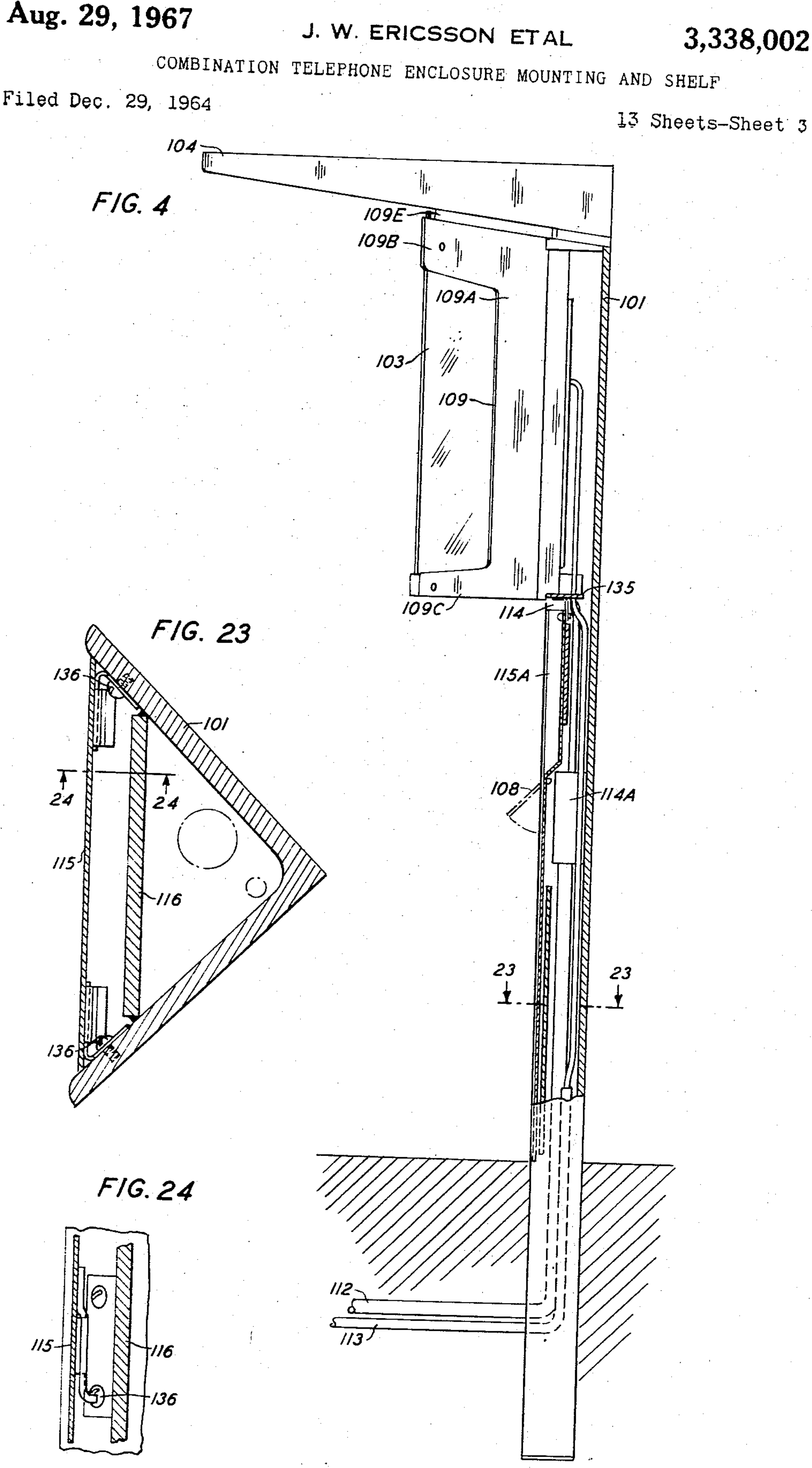
FIG. 4 is a partially broken away side view.
FIG. 23 is a section taken along the line 23—23 of FIG. 4.
FIG. 24 is a section taken along the line 24—24 of FIG. 23.
Figure 7:
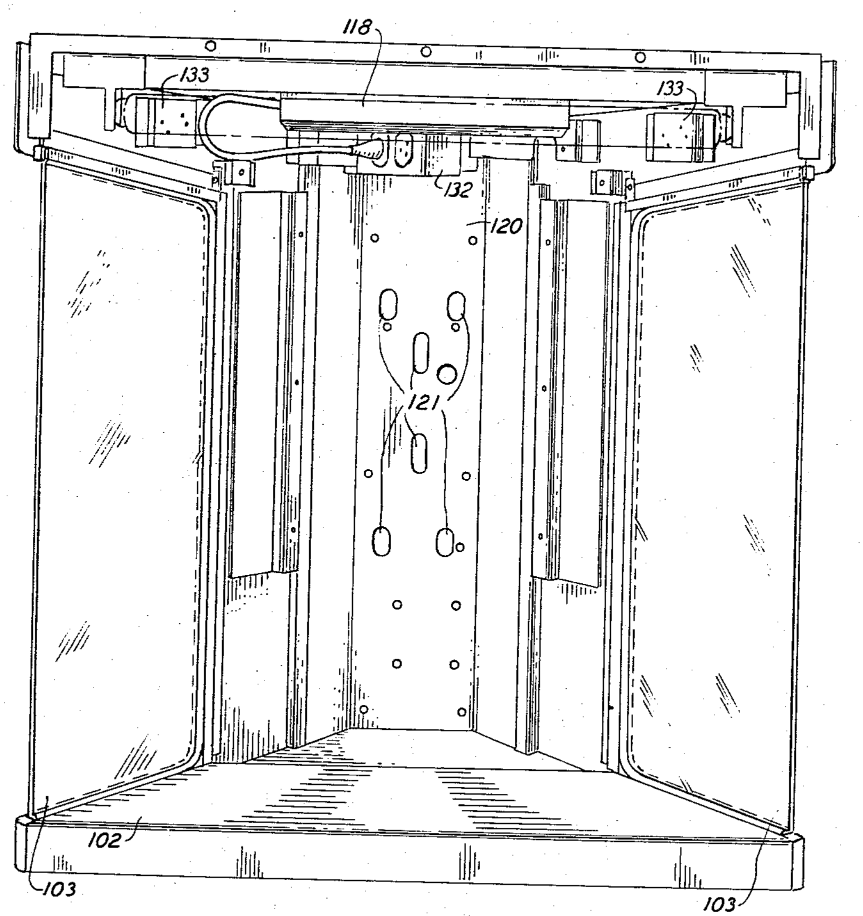
FIG. 7 is a front perspective view of the basic mounting shown in FIG. 1 with the telephone shrouding, sign and canopy removed.
Figure 6:
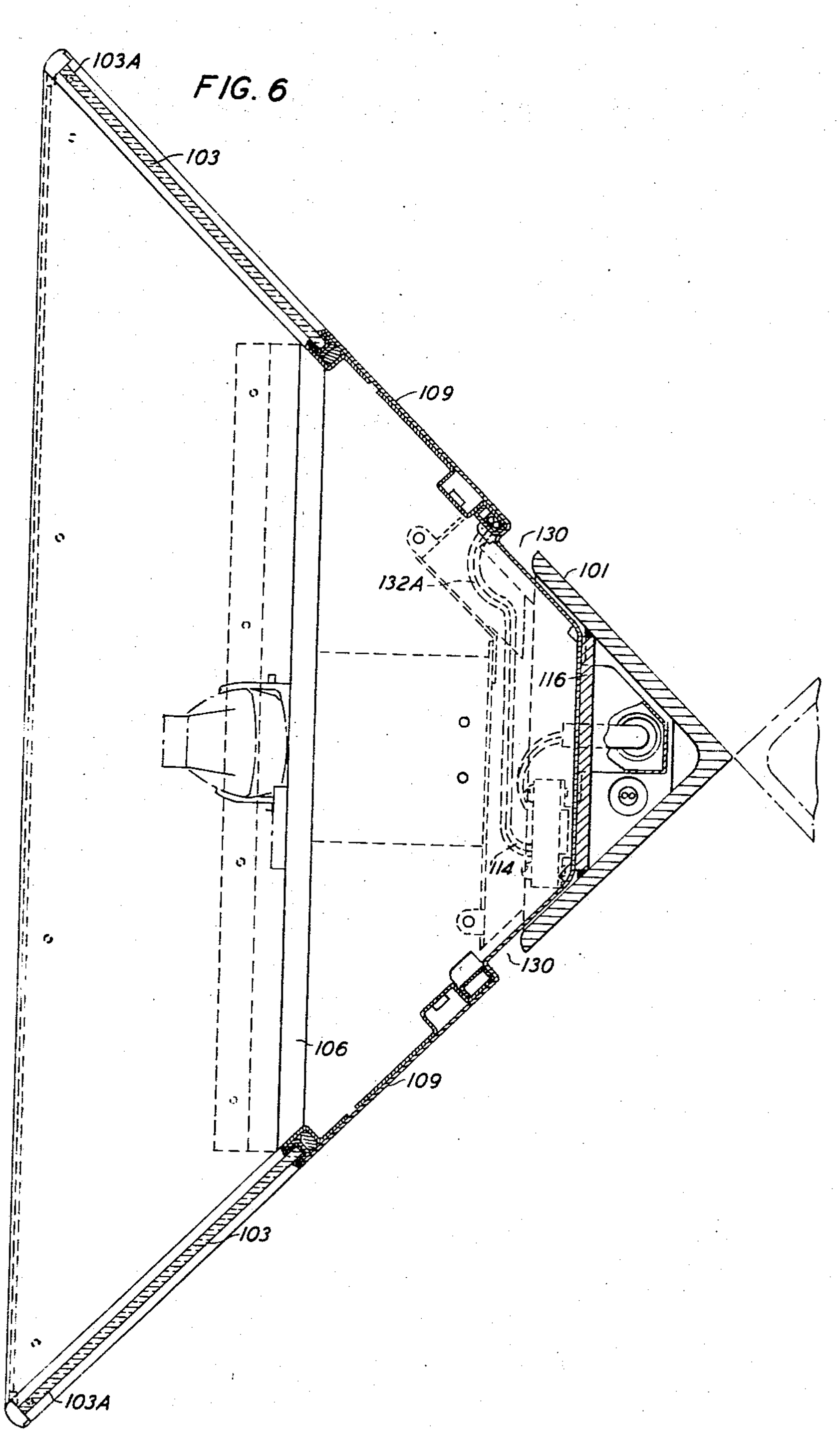
FIG. 6 is a section taken along the lines 6—6 of FIG. 5.

Each of the cut-out, side or wing portions of housing 109 includes a vertical portion 109A, a lower arm 109C, and an upper arm 109B, as shown in FIG. 4. The rear of housing 109, which is the truncated portion thereof, is a flat surface that is designed for placement in juxtaposition to a mounting panel 116 secured in mounting post 101, as shown in FIG. 6. Also as shown in FIG. 6, housing 109 is fitted into the open portion of angle support post 101 to a point that leaves a vertical gap 130 on each side thereof, see FIGS. 2 and 6, which gap complements the upper gap 131, FIG. 2, between the upper portion of housing 109 and the lower portion of canopy 104. The rear portion of housing 109 is provided with clearance holes, shown in panel 120, which correspond to the mounting apertures 121 found in the rear support as shown in FIGS. 7, 10 and 11.

Housing 109 provides a space for the mounting of certain wiring facilities. A duplex power outlet box 132 and a telephone protector 133 are mounted in the space above and behind illuminated sign panel 105, see FIGS. 5 and 7, and are accessible by the removal of this panel.

Outlet box 132 is interconnected by suitable wires such as 132A to a junction box 114, FIG. 4, below shelf 102. This arrangement allows for wiring from either the top or bottom of housing 109. A fluorescent lamp fixture 118 is mounted behind sign panel 105 and plugs directly into outlet box 132.

*Post supports*

Within the scope of the invention a variety of support structures or posts are provided for mounting the basic housing in various environmental and structural combinations. A relatively long post, as shown in FIG. 1, is designed for "walk-up" height and a somewhat shorter post, not shown, is designed for "drive-up" use. For support, both of these posts may be buried directly in concrete, as shown in FIG. 4. Alternatively, posts of either of the heights indicated may be affixed to a pedestal type base, not shown, which may be set on top of the ground or other horizontal mounting surface.

Figure 5:
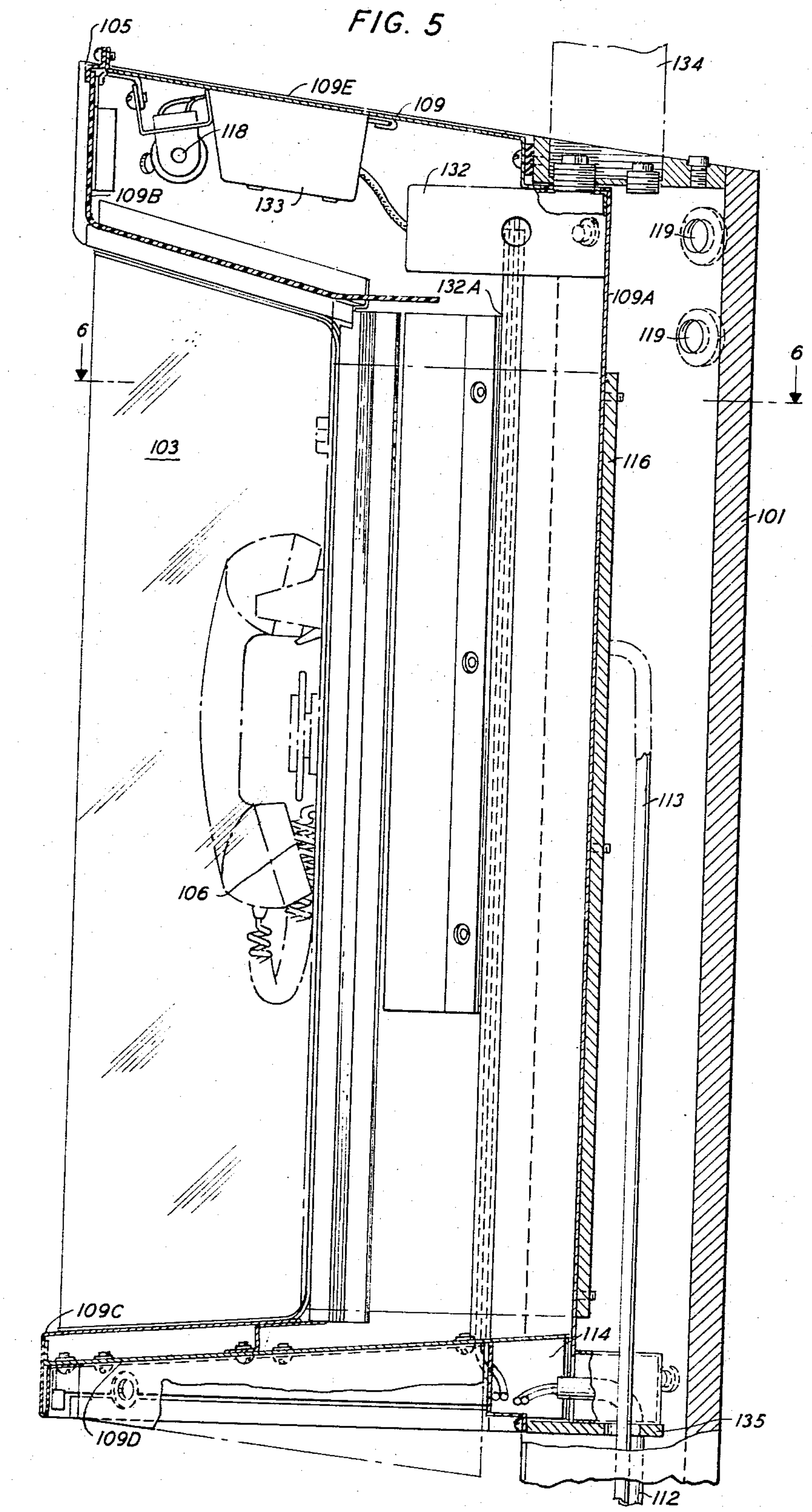
FIG. 5 is a side view of the upper portion of the structure taken along a typical section thereof.

Mounting posts are typically formed of structural steel angles having dimensions of 6" x 6" x ⅜". The top of the post, best seen in FIG. 4, is cut at a slight angle such as 7 degrees, for example, and has a ¾" triangular steel gusset 110, FIG. 3, welded in place, sealing off the end. Gusset 110 has a group of drilled holes 111 for canopy bolts and also for power and telephone conduits, provided such conduits are to be fed in from overhead rather than from underground. In the event of overhead feed, a mast 134, partially shown in broken outline in FIG. 5, may be provided as a conduit guide. A second gusset 135 is affixed in the apex of post 101, as shown in FIGS. 4 and 5, at the proper height to support the bottom of housing 109 which is fitted between gussets 135 and 110. A backing plate 116, shown in FIGS. 5 and 6, is affixed, as by welding, across the open portion of post 101 to provide a base for the fastening of housing bolts. The lower portion of post 101, below housing 109, typically includes additional gusset plates, not shown, to close the triangle and increase the stiffness of the post.

To close the open triangle of the post 101 below housing 109, a cover plate 115, typically of anodized aluminum, is employed. A cover plate, such as plate 115, is suitably affixed or held in place by brackets 136, shown in FIGS. 23 and 24. An upper cover plate 115A, FIG. 1, is formed with a deep pocket to provide clearance for the back of telephone directory 107 which hangs from the underside of housing shelf 102. The lower section of cover plate 115A has a spring loaded hinged door 108 for access to a circuit breaker 114A, FIG. 4. Circuit breaker 114A may be used for service entrance underground in which case it is fed by a telephone conduit 113 and a power conduit 112, FIG. 4.

Figure 16:
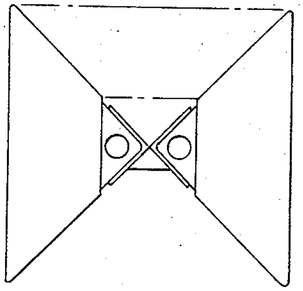
FIG. 16 is a top schematic view of two mounting structures in accordance with the invention, in a "back-to-back" relation.
Figure 17:
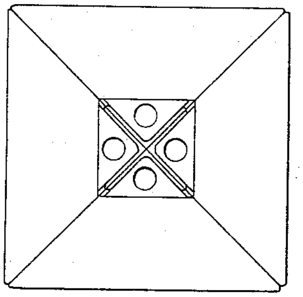
FIG. 17 is a top schematic view of four mounting structures in accordance with the invention in a double "back-to-back" relation.
Figure 18:
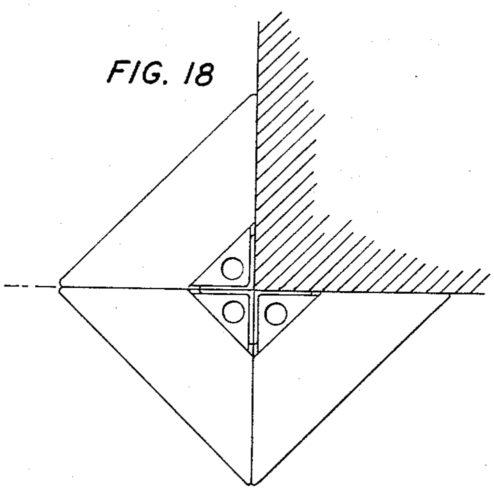
FIG. 18 is a top schematic view of three mounting structures in accordance with the invention arranged in an "around-the-corner" relation.
Figure 21:
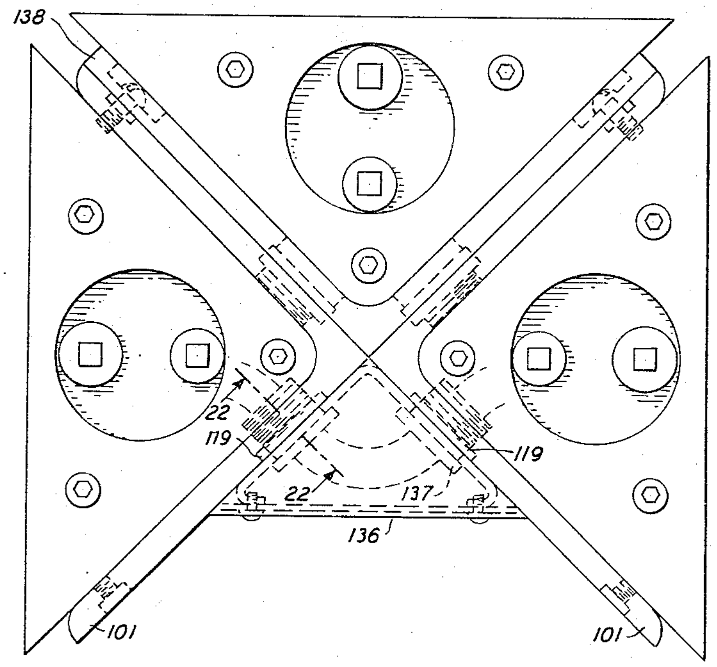
FIG. 21 is an enlarged detailed presentation of the arrangement shown in FIG. 16, with the addition of a third mounting structure.
Figure 22:
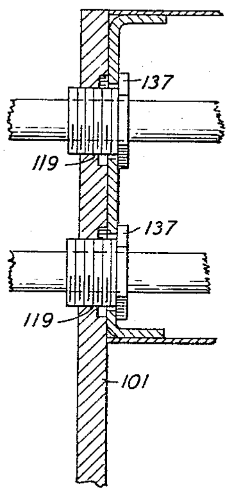
FIG. 22 is a section taken along the line 22—22 of FIG. 21.

Each leg in the upper portion of post 101 has a set of threaded holes 119, FIGS. 2, 5, 21, and 22. These holes are normally filled with nylon disks which act as watertight plugs. When two or more posts are used back-to-back, as shown in FIG. 16, or in FIG. 21, and only one post is provided with power and telephone wiring, a triangular wiring enclosure 136, FIG. 21, is provided. The enclosure 136 fits between the posts and is held in place by Chase nipples 137 threaded into the holes 119 in the post. The conduit thus formed serves to pass wires from one post to the other. Enclosure 136 together with nipples 137 also serve as a means of support for fastening the top of the posts together to ensure a close fit.

*Wall supports*

Figure 14:
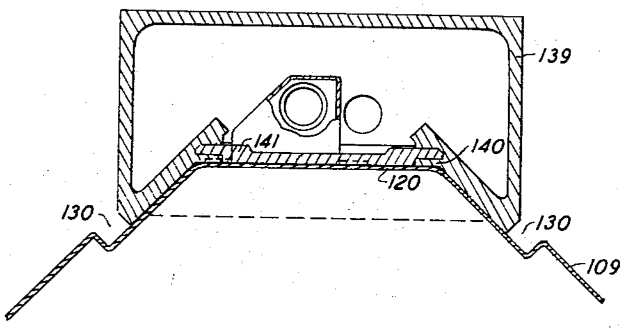
FIG. 14 is a simplified section taken along the line 14—14 of FIG. 11 with the addition of a partially fragmented housing structure.
Figure 19:
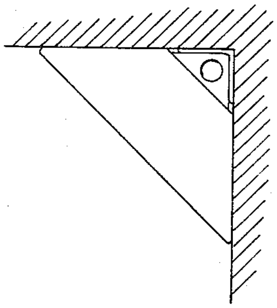
FIG. 19 is a top schematic view of a structure in accordance with the invention in an "in-the-corner" arrangement.

In accordance with the invention, unique wall support structures may be employed as a mounting for the basic housing in lieu of posts. A first wall support structure 138, shown in FIG. 10, is designed for mounting in 90 degree corners, as shown in FIG. 19, for a side wall mounting, or for adding a housing such as housing 138, FIG. 21, to the back-to-back "walk-up" installations shown in FIG. 21. Another wall mounting structure 139, shown in FIG. 11, is designed for mounting a housing perpendicular to a flat wall, as shown in FIG. 20. These supports shown in FIGS. 10 and 11 may advantageously be constructed from extruded aluminum shapes. Dimensions, other than height, are substantially those listed above for the "walk-up" or "drive-up" post structures. The extrusion has slots 140 to receive an extruded aluminum backboard 141 for the housing, which backboard is slid into place from the bottom and suitably fastened with screws, as shown in FIGS. 10 and 11. The housing is then attached in the same manner as it is on the post. The top of each of the wall support structures 138 and 139, as shown in FIGS. 10 and 11, respectively, is closed with a triangular gusset member 110 with suitable holes for power and telephone conduits and for assembling canopy 104 to the top. The bottom is closed, similarly, with a gusset 135 with suitable apertures for power and telephone leads. As shown in FIG. 14, support 139, shown in FIG. 11, is substantially rectangular in cross section.

*Canopy*

Figure 15:
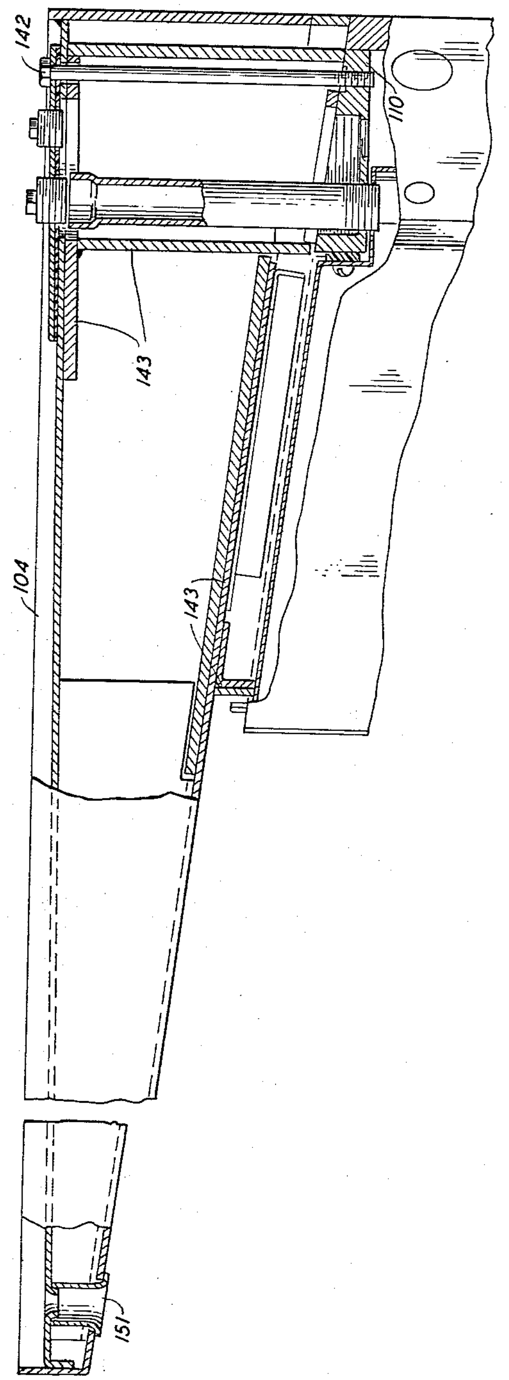
FIG. 15 is a side view, partially in section, of the canopy shown in FIGS. 1, 2, 3, and 4.

Canopy 104, shown generally in FIGS. 1 and 2, and in cross section detail in FIG. 15, is a wedge-shaped structure typically formed from anodized aluminum. The bottom of the canopy is a sheet member turned up on three sides to form a pan with a slight slope upwards from the rear corner thereof. The thickness of canopy 104 tapers from rear to front, as shown. This taper permits sloping the top roof surface toward weep holes 151 located in the front two corners thereof and avoids the formation of rain pools in the center of a group of four canopies.

The canopy is held in place in the rear with suitable fasteners such as steel bolts 142 which are threaded into the top gusset 110 which is welded into the top of the post or support. Various internal structural members 143 provide canopy 140 with sufficient strength to withstand extreme service conditions.

*Coin telephone mounting*

Figure 12:
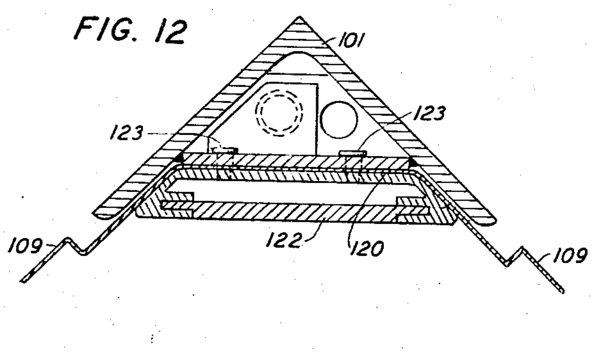
FIG. 12 shows the corner supporting structure of FIG. 6 with the addition of an adapter plate to facilitate the mounting of other than a flush type telephone.
Figure 8:
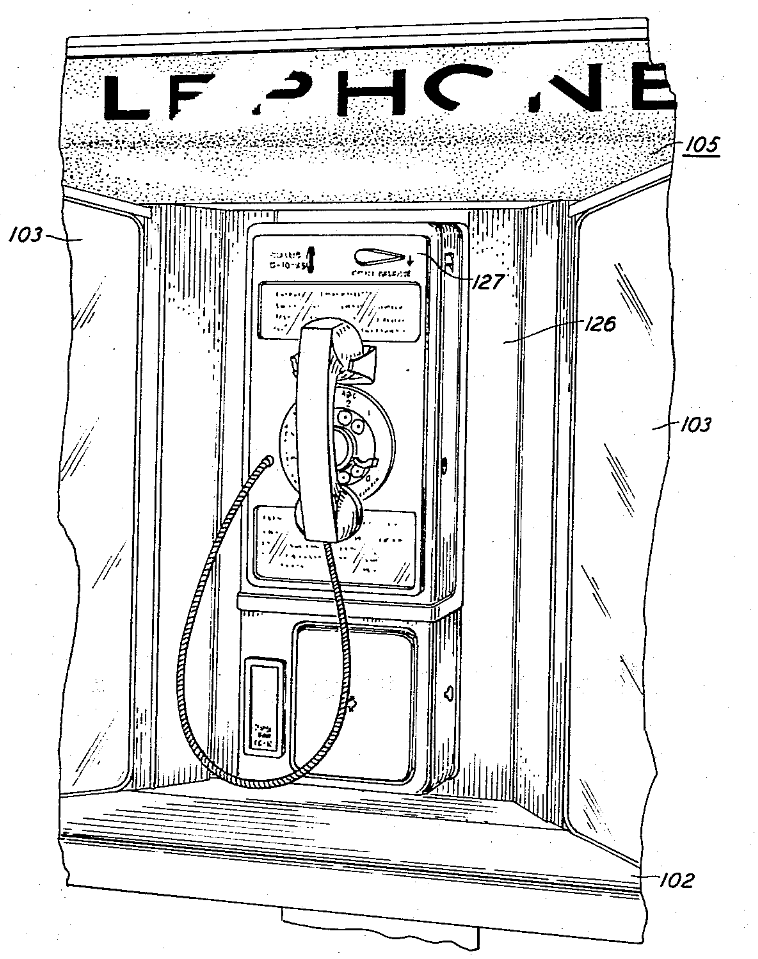
FIG. 8 is a fragmentary front perspective view showing the adaptation of the structure to a particular type of telephone set.
Figure 9:
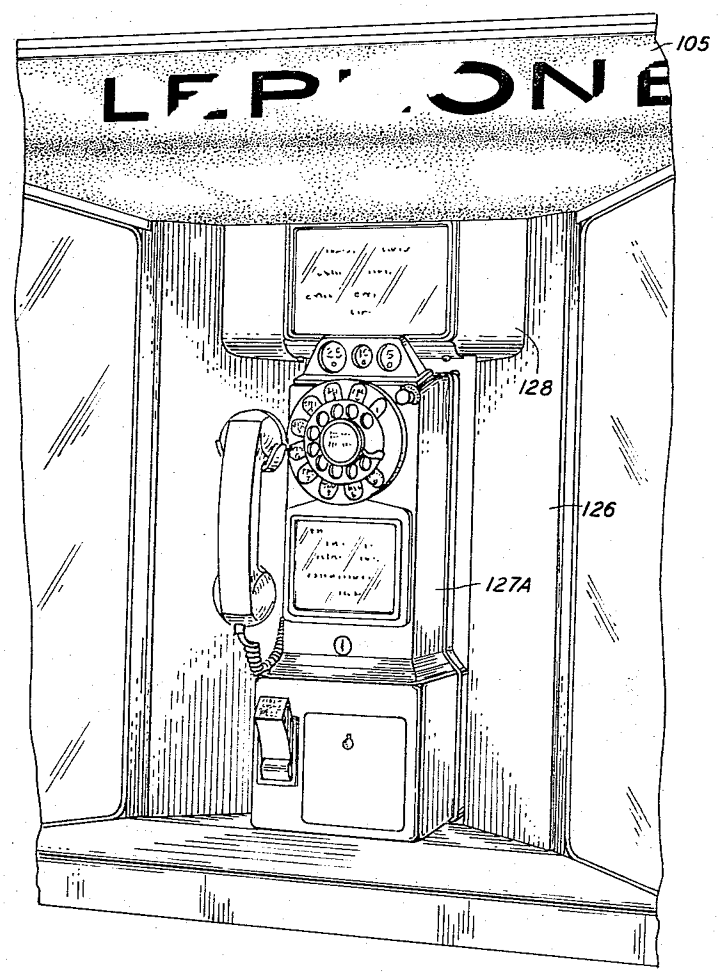
FIG. 9 is a front perspective, partially fragmented view showing the adaptation of the structure to a particular type of coin telephone.
Figure 13:
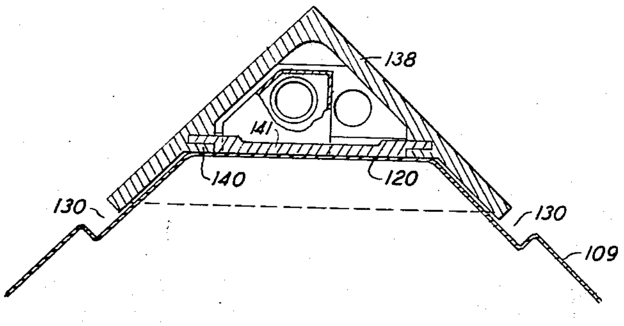
FIG. 13 is a simplified section taken along the line 13—13 of FIG. 10 with the addition of a partially fragmented housing member.

As indicated in FIGS. 1, 8, and 9, various arrangements may be employed in accordance with the principles of the invention to accommodate the mounting of coin telephones of different design. Thus, for example, in FIG. 1, a flush or panel coin telephone 106 is employed with the vertical edges of the panel being substantially coincident with the outer edges of the vertical portions 109A of housing structure 109. With other telephone models such as the 233 type set, 127A, as shown in FIG. 9, and the 1A1 set 127, as shown in FIG. 8, shrouding material 126 and 128, which may be of aluminum or stainless steel, for example, is employed to fill out the surrounding inside portion of the housing 109. Additionally, in mounting a telephone other than a flush or panel type it is useful, as shown in FIG. 12, to employ an adapter plate 122.

It is to be understood that the embodiments described herein are merely illustrative of the principles of the invention and various modifications may be effected by persons skilled in the art without departing from the spirit and scope of the invention.

What is claimed is:

1. Coin telephone mounting apparatus comprising, in combination, framing means defining the boundaries of a truncated wedge-shaped housing, means for mounting a coin telephone inside of said housing across the apex thereof, a telephone sign enclosure substantially triangular in horizontal cross section mounted in the upper portion of said housing, the underside of said enclosure being sloped slightly inwardly and downwardly to form a top for said housing, a substantially triangular canopy member mounted above said sign enclosure, said canopy's underside being sloped inwardly and downwardly toward said apex, said canopy extending outwardly beyond said framing means to form a roof over said housing with a substantial overhang portion, a substantially triangular shelf member mounted to form the bottom portion of said housing, and means for mounting said apparatus at an elevated level.

2. Apparatus in accordance with claim 1 wherein said mounting means comprises a mounting post having two sides forming an open angle of substantially 90 degrees, a mounting plate affixed across said open angle, means for securing said framing means to said mounting plate, a first gusset member affixed across the top of said post to provide a mounting means for said canopy, a second gusset member affixed in said open angle to provide a bottom support for said framing means, and cover plate means affixed across said open angle providing thereby an enclosed channel for the accommodation of junction boxes and power and telephone lead-ins.

3. Multiple telephone housing means comprising, in combination, a pair of support posts each comprising first and second side portions joined to form an included inside angle, substantially a right angle, said posts being positioned in back-to-back fashion with the open portions thereof being diametrically related, each of said posts including a respective mounting plate disposed across said open portion thereof, a pair of integral framing means each defining the boundaries of a truncated wedge-shaped enclosure having an included inside vertical angle of substantially 90 degrees, means affixing each of said framing means to a respective one of said mounting plates, the included inside angle of each of said framing means being fitted within the included inside angle of a respective one of said posts, each of said framing means comprising a pair of wing portions bounding said included inside angle thereof, each of said wing portions being cut away in the central portion thereof to form an upper outwardly extending arm and a lower outwardly extending arm, said panel members each being accommodated within a respective one of said cut-away portions, each of said framing means being capped with an illuminatable telephone sign enclosure having a lower surface thereof inclined inwardly and downwardly, each of said sign enclosures being affixed between a pair of said upper arms, a substantially triangular shelf member mounted across the bottom portion of each of said framing means, each of said shelf members being affixed between a pair of said lower arms, and cover members affixed across said open portions of said posts.

4. Apparatus in accordance with claim 3 including a third one of said framing means mounted between said pair of framing means.

5. Apparatus in accordance with claim 4 including a fourth one of said framing means mounted diametrically opposite said third one of said framing means.

References Cited

UNITED STATES PATENTS

| | | | |
|---|---|---|---|
| 2,995,221 | 8/1961 | Sherron | 52—234 X |
| 3,046,614 | 7/1962 | Sherron | 52—282 X |
| 3,105,271 | 10/1963 | Sherron | 52—36 X |
| 3,239,979 | 3/1966 | Sherron | 52—234 |

OTHER REFERENCES

Sweet's Architectural Catalog File, 1962 Section, *a/Ph* pages 1–4.

FRANK L. ABBOTT, *Primary Examiner.*

M. O. WARNECKE, *Assistant Examiner.*